United States Patent [19]

Schlag et al.

[11] Patent Number: 5,327,418
[45] Date of Patent: * Jul. 5, 1994

[54] CIRCUIT ARRANGEMENT FOR CENTRALLY CONTROLLED TELECOMMUNICATIONS EXCHANGES

[75] Inventors: Richard Schlag; Franz Schroeder, both of Munich, Fed. Rep. of Germany

[73] Assignee: Siemens Aktiengesellschaft, Berlin and Munich, Fed. Rep. of Germany

[*] Notice: The portion of the term of this patent subsequent to Oct. 10, 2006 has been disclaimed.

[21] Appl. No.: 977,723

[22] Filed: Nov. 16, 1992

Related U.S. Application Data

[63] Continuation of Ser. No. 428,138, Oct. 27, 1989, abandoned.

[30] Foreign Application Priority Data

Oct. 28, 1988 [DE] Fed. Rep. of Germany ....... 3836800
Feb. 21, 1989 [DE] Fed. Rep. of Germany ....... 3905296

[51] Int. Cl.$^5$ ............................................. H04Q 11/04
[52] U.S. Cl. .................................... 370/58.1; 370/58.3
[58] Field of Search .................. 370/68; 379/333, 334, 379/268, 165, 22, 27

[56] References Cited

U.S. PATENT DOCUMENTS

| | | | |
|---|---|---|---|
| 4,754,480 | 6/1988 | Mattis et al. | 379/333 |
| 4,755,995 | 7/1988 | Anderson et al. | 371/9.1 |
| 4,873,694 | 10/1989 | Schmidt et al. | 370/58.1 |
| 4,891,810 | 1/1990 | de Corlieu et al. | 371/9.1 |
| 4,905,222 | 2/1990 | Seeger et al. | 370/58.1 |
| 5,079,761 | 1/1992 | Krumenacker et al. | 370/58.1 |

FOREIGN PATENT DOCUMENTS 0125602 5/1984 European Pat. Off. .

OTHER PUBLICATIONS

"System Initialization in a Distributed Digital Switch", G. Chahil, Conference Record, IEEE Global Telecommunications Conference, Dec. 2-5, 1985, New Orleans, La., vol. 2, pp. 899-902.

"Digital Concentrators in the EWSD Telephone Switching System", Frieser et al., Telcom Report, vol. 5, No. 4, pp. 262-266.

European Search Report EP 89 11 8712.

*Primary Examiner*—Douglas W. Olms
*Assistant Examiner*—Shick Hom
*Attorney, Agent, or Firm*—Adel A. Ahmed

[57] ABSTRACT

In a circuit arrangement for centrally controlled telecommunication trunk exchanges, including PCM telephone trunk exchanges, with line trunk groups with submatrices, which are connected with duplicate central processors and duplicate switching matrices, line trunk groups connected with duplicate switching matrices over two link circuit systems and each having, among other things, a submatrix and a local controller, are divided into two categories. Concentrators are always connected to one line trunk group in each category. For the loading of the controllers and concentrators with new programs and/or data, one processor continues to perform the switching procedures, while only the controllers in the first category remain connected with it, while the concentrators continue to make connections only over the line trunk groups in the first category. The other processor is connected to the controllers in the second category and performs loading procedures for and through them. Thereafter, connections are established over line trunk groups in both categories with the aid of both processors and the line trunk groups in the first category are then blocked with respect to new information, and only connections that are in the process of formation or already in existence are continued. Next, the other processor loads the first processor and the latter loads the line trunk groups in the first category. Total shutdown of the system when programs, data and/or processors are changed is avoided.

14 Claims, 1 Drawing Sheet

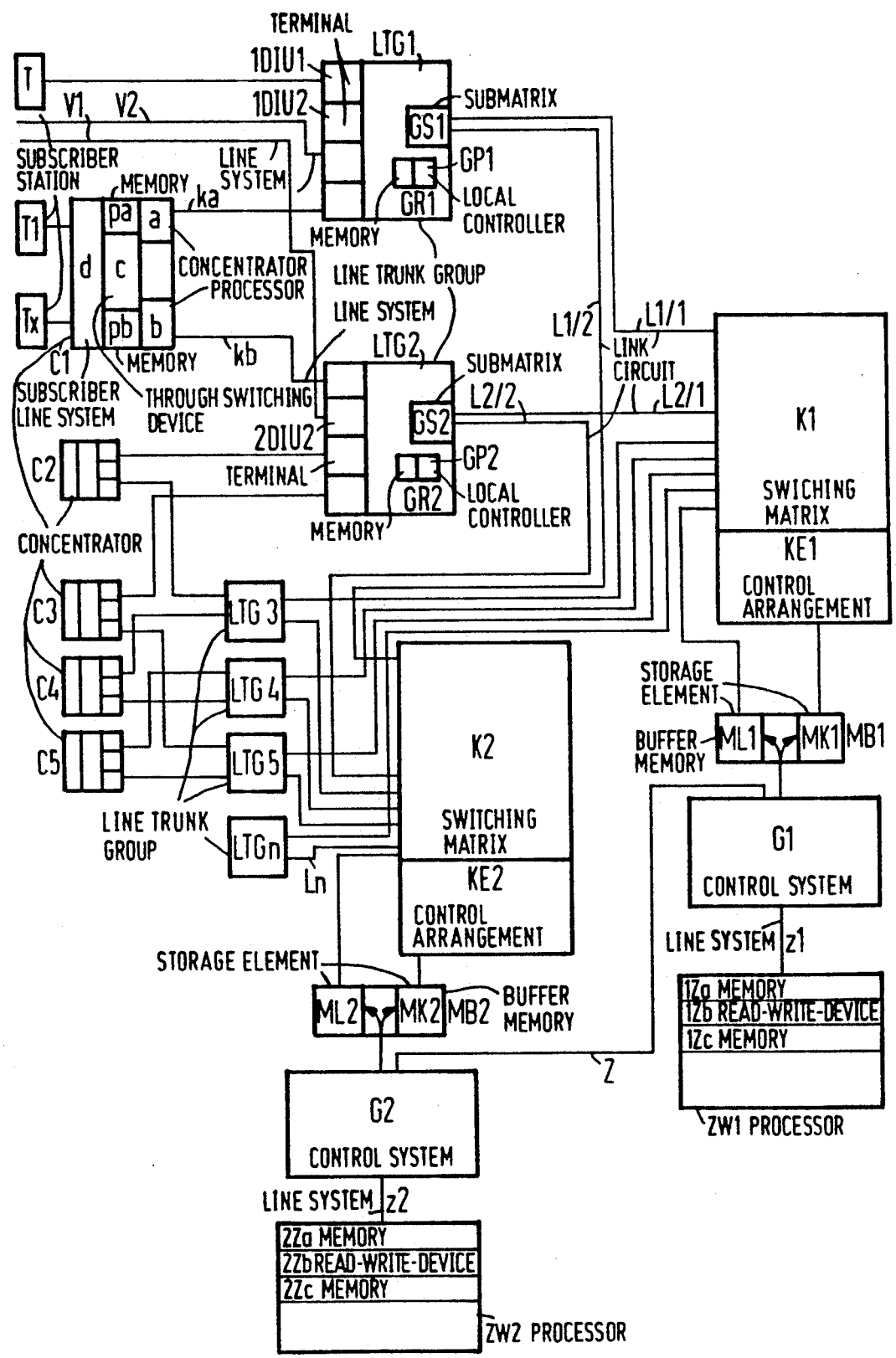

CIRCUIT ARRANGEMENT FOR CENTRALLY CONTROLLED TELECOMMUNICATIONS EXCHANGES

CROSS-REFERENCE TO RELATED APPLICATION

This is a continuation of Ser. No. 07/428,138 filed Oct. 27, 1989 now abandoned.

FIELD OF THE INVENTION

The present invention relates to a circuit arrangement for centrally controlled telecommunications exchanges and, more particularly to PCM-TDM exchanges wherein are provided, in duplicate, a central switching matrix used for through-connection and a program-controlled central processor for standby operation which, inter alia, serves to control the matrix and to process the switching signals that are required for this purpose, and wherein a plurality of local line trunk groups are each equipped with a submatrix for the external connection of trunk and/or subscriber lines and with a local programmable control device for receiving the switching signals from these lines, to pre-process the switching signals and transmit them to the central processor and to transmit switching signals over these lines, and wherein, the respective submatrix in each of these line trunk groups is connected internally, group by group, separately over two groups of link circuits to switching matrix lines respectively appurtenant to one and the other of the two switching matrices that are provided in parallel, and wherein, for a data exchange between the controllers on the one hand and the operational or preoperational processor, as the case may be, on the other, which serves for the switching signal operations referred to above and for the transmission of program and switching software, data links for each controller are brought by the processor in operational condition through the switching matrix assigned thereto to the local controllers or are retained therein, and wherein concentrators equipped with concentrator processors are connected, in their higher-ranking center, to the submatrices of at least two line trunk groups, in order to perform their connecting process through one or the other of the line trunk groups. U.S. Pat. Nos. 4,905,222, issued Feb. 27, 1990, and 4,873,694, issued Oct. 10, 1989, each of which is assigned to the same assignee as that of the present application, disclose circuit arrangements for centrally controlled telecommunications exchanges which may be viewed as related to the present invention.

BACKGROUND OF THE INVENTION

A circuit arrangement of this type is already known from the journal "Telcom Report" Vol. 5 (1982), No. 4 (English-language edition), pp. 262 et seq. In the same journal, in the 1981 supplement to the German-language edition, and in particular on pages 7 et seq., 19 et seq. and 49 et seq. other relevant details are discussed. On pages 19 et seq., there are shown and described, among other things, the submatrices of the peripheral line trunk groups (LIUs). Internally, they are connected to the dual central switching matrix ("switching network") and externally, through line terminal units (LTU/DIU) to analog circuits or channels of digital transmission systems. In the above-mentioned English-language edition, concentrators are described. They are connected in their respective master switching center to the submatrices of at least two line trunk groups. Each one of the connection establishment procedures is performed over one or the other of these line trunk groups. Thus, both line trunk groups are initially available for all the connecting procedures. There is a description on page 8 of the above-mentioned German-language edition of the cited journal, there is a description on page 8 of the control channels (designated in the introduction as "data links") that are constantly switched through, in an operational state, by the double switching matrix. In this known case, the central switching matrix and the central processor are provided in duplicate for reasons of reliability. This duplication does not represent any substantial expense in the overall context of a switching center of this kind, because it relates to only a few local components. The peripheral line trunk groups and their appurtenant components, such as the local controller and the submatrix, are present in greater numbers, and consequently on a wider scale, and are therefore not duplicated. In the event of a failure in a line trunk group (for example, in its submatrix or its local controller or its power supply) the proportion of all the connected subscriber lines, concentrator main lines and trunk lines that is affected is relatively so small that the temporary interruption of operation, which is thus so limited, is taken for granted in exchanges of the known type described above.

The control channels mentioned above are the same as the data links referred to in the introduction, which must be provided for the exchange of data which serves both for the processing in the CPU of the dialing information arriving in the line trunk groups and the transmission of program and switching software from the central processor to the local controllers and which thus takes place between the local controllers on the one hand and the central processor on the other, and which are brought for this purpose into operational condition or kept constantly available in the processor. On page 25 of the German-language edition of the above-mentioned journal there is a detailed description of how the local controllers are loaded at the start of the switching operation with programs and fixed data from the central processor through these control channels. Loading procedures of this kind must be performed for each of the local controllers. Performance of the loading procedures is necessary not only when the system is turned on (at the start of the switching operation), but also in stand-by situations, when the switching operation that is being conducted with one of the two parallel switching matrices and one of the two central processors—namely, the central processor assigned to the central switching matrix in question—is continued with the other central switching matrix and the other central processor, instead of with the present central switching matrix and central processor.

These standby situations become necessary, in particular, when breakdowns occur or errors are made—in other words, for the most part, without any advance warning. Errors and breakdowns can be sufficiently serious that immediate standby operation is necessary. Frequently, however, such errors and breakdowns affect only parts of the entire exchange; for example, only a part of the central switching matrix, or only specific functions in it or in the central processor. Otherwise, they may occur sporadically.

In such cases—that is, in most cases where standby operations are necessary—the standby procedures in question can be postponed for a short time. Since the loading procedures described above that are associated with a standby procedure involve large quantities of data and must be performed for each local controller, they are relatively time-consuming. Since these loading procedures must be performed completely before the switching operation itself can be commenced or resumed, standby procedures sometimes result in an undesirably long interruption of operation.

In addition, there are also operating situations in which the program software must be altered, particularly in the local controllers. This means that it must be renewed. There are also operating situations in which operating data that are stored in the local controllers or in the concentrator processors of the concentrators must be changed. These operating data may include subscriber switching data and information about system operating rights that the various subscribers possess, as well as their line situation data and so on. There is thus a considerable number of operating situations in which it is necessary for loading procedures to be performed for the local controllers that are included in the link trunk groups, and, possibly, also for the above-mentioned concentrator processors.

SUMMARY OF THE INVENTION

An object of the invention is therefore to create more favorable operating conditions for standby measures and loading procedures of the kind referred to above in a circuit arrangement of the kind described in the introduction and in this connection, to avoid undesirably long interruptions of operation.

The invention accomplishes this object by creating two categories of line trunk groups, by having each concentrator connected to a line trunk group selected from the first category and a line trunk group selected from the second category, and when the controllers are loaded with program information and/or line data and, if necessary, the concentrator processors are also loaded with connecting data in a similar manner, in the first place, the two individual connections for each line trunk group to the two switching matrices are reduced to one connection, with the line trunk groups in the first category remaining connected to the first of the two switching matrices and the line trunk groups in the second category to the second of the two switching matrices, and with the controllers of the line trunk groups in the first and second categories remaining connected, through the data links in question, to the processor corresponding to the first and second switching matrices, respectively, in the second place, the further connecting procedures continue to be carried out with the aid of the line trunk groups belonging to the first category, whose controllers are connected to the processor that is still conducting the operation at the time, and, in the third place, the other processor performs the loading procedures with the controllers of the line trunk groups belonging to another category (for example, the second) category and, after the loading is completed, in the first place, the controllers in question—that is, those that have been loaded by this process—are made accessible to the concentrator processors by the last-mentioned processor for the transmission of connecting data for new connections, and, in the second place, connecting procedures for new connections are performed from then on by the last-mentioned processor as well.

In accordance with an aspect of the invention, when there is a change of programs, connecting and system data, or central processors and the like, any total shutdown of an exchange in connection with the loading procedures that become necessary in such a situation is completely avoided; the invention also prevents connections that are switched through or are being established from being interrupted. Instead the operation of the exchange can continue smoothly through a change of the kind described above, even for connections that have been established (already switched through from subscriber to subscriber, with communication already under way), are being switched through (connections are in the establishment stage at the time) or are about to be switched through (subscriber lifts the receiver and intends to start dialing, is waiting for the dial tone or is waiting for a connection to a free dialing signal receiver).

Another aspect of the invention enables the other processor, which has thus in the given case taken over the operative function with regard to the switching procedure, to be relieved of its load, and comprises having the first processor, which initially has still remained operative (after the loading of the controllers of the line trunk groups of the second category by the other processor has been completed and after the other processor has taken over the operative processor function with regard to the switching procedure and after a blocking of the controllers of the line trunk groups of the first category with respect to connecting data has taken place in connection with the takeover), receive the loading of the above-mentioned new information and data from the other processor and in then having the first processor load the controllers of the line trunk groups of the first category with this information and data and thereupon interrupt the data links to these controllers, and then having the other processor switch through data links to these controllers and block them again for connecting data with respect to the connected concentrators.

By this means, in addition, the work load is reduced on the "other" processor, that is, the one that, in the given case, has taken over the operative function with regard to the switching procedure. It does not need to load with information and data the controllers of all those line trunk groups that belong to the first category; instead, it performs a loading of this kind only with respect to the first processor, which thus initially had still continued to be the operative processor. This processor then performs the loading procedures for all those controllers that belong to the line trunk groups of the first category. There is a further advantage which occurs in the context of other situations that will be described below. In corresponding memories of the central processors, the controllers of the line trunk groups are marked by storage techniques as being connected with the respective processor and accessible to it for purposes of data exchange, or—in the contrary situation—not marked. Controllers that have not been marked in a processor in this manner are thus practically not accessible to the processor concerned for the time being, which also applies to the procedure of loading with new information and data. Furthermore, with regard to the loading of the controllers with the new information and data for the processors, there are in principle two possibilities. A processor can either drive individually and in succession the controllers that are marked in it as accessible in order to transfer the new information and data to them individually in succession, or it can drive all the controllers marked in it as accessible at one time and send this new information and data simultaneously for all these controllers, the data being therefore also received simultaneously in these controllers. These situations are of special importance with regard to the loading of the controllers of the first category, which was discussed in greater detail above. If such a loading is carried out by the so-called other processor, then in addition to the controllers of the line trunk groups in the second category, the controllers of the line trunk groups in the first category must also be marked in it by storage techniques as accessible for, among other things, loading with the new information and data, after the above-mentioned data links to these controllers of the first category have been switched through. Therefore, in this case, the other processor performs the loading procedures for new information and data and, necessarily—which is of special importance—it does this for the controllers of the line trunk groups in the first category individually, in succession, since the simultaneous loading, described above, of all controllers marked as accessible in the other processor by storage techniques cannot be performed in this case, because the controllers of the line trunk groups in the second category have also been marked by storage techniques as accessible in this other processor. According to the aspect of the invention described above, the process, described earlier in greater detail, of having the loading procedures performed simultaneously can, however, be used, in which case, the so-called first processor therefore simultaneously drives all the controllers marked in it by storage techniques as accessible, namely the controllers of the line trunk groups of the first category (and only those controllers) and, simultaneously, sends to their controllers the new information and data, which can thus be simultaneously received in these controllers. By this means, all the procedures for loading the controllers of the first category with the new information and data can be very substantially reduced.

BRIEF DESCRIPTION OF THE DRAWING

The drawing represents an embodiment of the invention, showing only those elements which contribute significantly to its understanding, although it is by no means limited thereto.

DESCRIPTION OF THE PREFERRED EMBODIMENTS

Two central switching matrices K1 and K2 are provided, with their respective control arrangements KE1 and KE2. Two central processors ZW1 and ZW2 are assigned to the switching matrices. Processors ZW1 and ZW2 are provided input-output control systems G1 and G2, with which they are connected by the assigned line systems z1 and z2. In addition, there are provided a large number of line trunk groups LTG1 and LTGn. The line trunk groups are connected with the two switching matrices through link circuits L1/1 to Ln. Each link circuit comprises a sizable number of lines or channel pairs that can be marked for individual connections. These link circuits can be constructed in a familiar manner as a PCM channel system. The switching matrices may be constructed in TDM technology, and may comprise both time and space switching stages. Central processors ZW1 and ZW2 are—as has already been mentioned—arranged in parallel. One of them is always in an operative state. It is connected with each of the line trunk groups through data links, which it switches through in each case by way of its switching matrix, and, in each case, with the local controller in each of the line trunk groups The establishment and maintenance of such data links via the central switching matrixes is done with the aid of control arrangements KE1 and KE2 in the same manner as is done in the establishment and maintenance of telephone connections. To this end, holding memories (not shown) are associated in a manner known per se to the switching matrixes of the switching matrix networks, K1, K2, in which switching data relating to the respective switching matrix are stored. With the aid of these holding memories, the required through-connections are available at the respective points in time, or the required write-in and read-out processes for the full stores of the time slot matrixes take place.

The data required to establish the data links are transmitted from the central processors ZW1, ZW2, via the buffer memories MB1 or MB2, and specifically via their storage elements MK1 or MK2, to the switching matrix control arrangements KE1 or KE2. For the intermediate storage of the data of the data link, the buffer memories MB1 or MB2 are provided with the storage elements ML1 or ML2.

The previously mentioned stand-by operation of one of the central switching matrices K1 or K2 and of one of the processors, ZW1 or XW2, proceeds in such a way that in conjunction with the setting up of data links and also in conjunction with the setting up of telephone connections, a transmission of control information takes place in the stand-by portion between processor and switching matrix control arrangement, and the switching matrixes are set up, but the through-connection of the corresponding paths via the switching matrix does not take place. It takes place only in the case of a switchover to the stand-by system.

The concentrators C1 through C5 are each connected, via two line systems, with two different line trunk groups. A more extensive description of the design and operating manner of a telephone exchange of the above-indicated type may be found in the journal "Telcom Report", as mentioned earlier herein. More extensive treatment of these topics may be found in German Patent Disclosure Documents. The mode of operation of these data links has already been described extensively in German disclosure document 3 106 903 (VPA 81 P 6209). German disclosure document 3 128 365 (VPA 81 P 6257) already contains an extensive description of the way in which data traffic is carried out between the central processor on the one hand and the local controllers of the line trunk groups on the other. These data links pass through the buffer memories MB1 and MB2, respectively. Buffer memories MB1 and MB2 contain storage elements ML1 and ML2 respectively for data, and storage elements MK1 and MK2 respectively for switching matrix setting information. The construction and mode of operation of these buffer memories have already been described in detail in German disclosure documents 31 06 868 (VPA 81 P 6207) and 31 06 879 (VPA 81 P 6208). Reference should also be made to German disclosure document 36 09 889 (VPA 86 P 1187), in which the joint operation of a telephone trunk exchange in TDM technology, which is described in the other disclosure documents, is described in connection with its joint operation with concentrators. These documents also already show and describe how a concentrator may be connected over two line systems with two different line trunk groups, that is, externally with its submatrices. In addition, both the construction and the mode of operation of a telephone trunk exchange of the familiar kind mentioned in the introduction has already been shown and described in detail in the journal "Telcom report," mentioned above.

In the drawing, therefore, there is shown a centrally controlled telecommunication system, which is constructed and operates in PCM-TDM technology. It serves as a telephone exchange. A central switching matrix used to switch through the connections, together with a program-controlled central processor that is used, among other things, to control the switching matrix and to perform the switching signal processing that is necessary for this purpose, is provided in duplicate. In addition, there are provided a large number of local line trunk groups LTG1 to LTGn. Each line trunk group includes a submatrix, for example GS1, for the external connecting of connection lines V1/V2 and subscriber lines to which subscriber stations T, T1, Tx (the last two being connected to a concentrator C1 which, in turn, is connected to the line trunk groups LTG1 and LTG2) etc. are connected.

Each of the line trunk groups, for example LTG1, contains, among other things, a local programmable controller, for example GP1. To each of these is assigned a memory, for example GR1. This memory serves to store both program information and operating data. These might include, for example data about the subscriber call number-subscriber line situation-allocation, or about specific operating modes to which the various subscribers are entitled, and so on.

The local programmable controllers, for example LTG1, are used, among other things, to receive switching signals from the above-mentioned subscriber lines and connection lines, as well as to preprocess switching signals and to route them to the central processor after they have been prepared. In addition, these controllers are used to send out the switching signals on the above-mentioned lines on the basis of control information that they receive from the central processor.

As has already been explained, in each of the line trunk groups, for example LTG1, the respective submatrix, for example GS1, is connected internally (in the drawing, on the right side of GS1) through two groups of link circuits, for example L1/1 and L1/2, on the one hand to switching matrix terminals of the first central switching matrix K1 and, on the other hand, to those of the other central switching matrix K2. Also mentioned above are the data links between the central processor on the one hand and the local controllers on the other hand. These data links are used for data exchange in the context of the switching signal treatment mentioned above, and for the transmission of program and switching software. These data links are brought to the local controllers in an operating state for each controller by the respective processor through the switching matrix allocated to it, or are retained therein (compare with the above citations in the literature).

Concentrators C1 to C5 have also been mentioned earlier. Each concentrator, for example C1, comprises two concentrator processors, for example, a and b (compare with DE-OS 3 609 889). Each concentrator is connected through two line systems, for example ka and kb, or channel systems, with two different line trunk groups, for example LTG1 and LTG2. In the line trunk groups, terminals 1DIU1 and so on are provided for the connection of subscriber lines, connecting lines, concentrator main lines and the like. The terminals (compare with DE-OS 3 607 903, designated in "telcom report" as "DIU" and "GS") are connected in turn with the submatrix within the line trunk group in question. The concentrators, for example C1, also include a through-switching device, for example c. This through-switching device is the equivalent of a switching matrix within the concentrator, by way of which every participating concentrator, for example T1, T, can be connected with each of the concentrator main lines. In addition, each concentrator includes subscriber line systems d (similar to DIU).

Next, two categories of line trunk groups are formed. The line trunk groups in the first category can include all those which comprise in their designation (LTG1 to LTGn) odd Arabic numbers (for example, LTG1, LTG3, etc.), while the line trunk groups in the second category might be those that include in their designation even Arabic numbers (for example, LTG2, LTG4, etc.). Thus, line trunk groups of two categories are formed. However, this category formation can be accomplished in any other manner. Each concentrator is connected to one line trunk group in the first category and one line trunk group in the second category. These connections may be selected and established arbitrarily among the line trunk groups in the first category on the one hand and in the second category on the other hand. All that is necessary is that each concentrator be connected to one arbitrarily chosen line trunk group in the first category and to one arbitrarily chosen line trunk group in the second category.

In the situation described here, the loading of the controllers with program information and/or operating data is of special importance; this data might, for example, be data about subscriber-specific line situation-call number allocations, or data about subscriber-specific rights to certain modes of operation and the like. In addition, operating data, particularly line data discussed above, are also loaded in corresponding memories, for example pa and pb, of the concentrator processors, which operate with these line data in an appropriate manner.

For the loading of the controllers with program information and/or with line data and, if necessary, also the loading of the concentrator processors with line data in a similar manner, the two individual connections for each line trunk group to the two switching matrices, as described above, are limited to only one connection. In this case, the line trunk groups in the first category (for example, LTG1, LTG3, etc.) remain connected with the first of the two switching matrices (for example, K1). Thus, the connection over the link circuits L1/1 is maintained, while the connections established over the link circuits L1/2 and L2/1 are interrupted. Since the line trunk groups in the second category remain connected to the second of the two switching matrices, the connection established over the link circuits L2/1 continues to exist, while the connections established over the link circuits L2/1 are also interrupted. This should be understood to mean that although the connections continue to be established in the physical sense, they are nevertheless no longer used, since they are no longer accessible, for example through the operation of the software.

As a result of the procedures described above, one half of the line trunk groups is connected through the first switching matrix only with the first processor, while the other half of the line trunk groups is connected through the other switching matrix only with the other processor. The other connecting procedures are now performed with the aid of the line trunk groups belonging to the first category, whose controllers are connected to the first processor (for example ZW1), which at this point is still operative. Connecting data for new connections, that are made through a concentrator, are routed in this processor in each case to that one of the two line trunk groups in question to which this concentrator is connected, which is connected to the processor that is still operative at the time. If it is assumed that subscriber stations are primarily or in principle connected to concentrators (that is, seldom or not at all connected directly to line trunk groups), there is only a slight limitation, if on the operating availability for the subscriber in question.

While the operative processor continues to be available for the connecting procedures over the line trunk groups in the first category, the second processor, whichever it may be, performs the loading procedures with the controllers of the line trunk groups belonging to the other category. For example, if the processor that is currently operative is ZW1 and the connections are being established over its switching matrix K1, then all the concentrators, for example C1, establish their connections through the line trunk groups in the first category, for example LTG1, and over the respective line system, for example ka, and over this switching matrix. Meanwhile, the other processor, for example ZW2, makes a connection through its switching matrix K2 with the line trunk groups in the second category, for example LTG2, and performs the loading procedures described above with these line trunk groups. In this case there is not only a loading of the respective memories within the line trunk groups, but also a loading of the above-mentioned data into the respective memories pa and pb of the concentrator processors a and b through the line trunk groups—that is, through their controllers. This can take place even during the current switching operations of the concentrator in question. In other words, while this concentrator is performing its switching procedures with the aid of one concentrator processor, for example a, the loading procedure can be performed over the other concentrator processor, for example b.

As a result of the completed loading of the controllers in question or their respective memories by the processor performing the loading, the controllers of the line trunk groups in question are then made accessible by that processor with respect to the concentrator processors for the transmission of connecting data for new connections. In the above descriptive example, it was mentioned that the loading of the controllers of the line trunk groups in the second category—for example LTG2/GP2—is done by the processor ZW2. The loading procedures extend not only to the line trunk groups in the second category and their memories, but also to the concentrator processors, as has already been explained.

Thus, the loading procedures described above have been performed by the processor that has so far not been operative. This processor then makes the controllers of the line trunk groups in the second category accessible to the concentrator processors for the transmission of connection establishment data for new connections. For the time being, then, the concentrators or their concentrator processors can make new connections over the first central switching matrix or over the other central switching matrix with the aid of the first central processor or with the aid of the other central processor. After the loading procedures have been completed for all the controllers of the line trunk groups of the second category, all the concentrators can, as a result form the new connections that are to be established over the line trunk groups in the second category as well.

The controllers of the line trunk groups in the first category are now made inaccessible to the concentrator processors for connecting data for new connections. Connecting data for new connections may relate to procedures for the establishment of completely new connections from the outset and/or to procedures for connections that are already in the process of formation, that is, in which the procedure for establishing the connection has already begun. The inaccessibility procedure described above is accomplished by the processor that was originally operative over the controllers of the line trunk groups in the first category. Shortly thereafter, this processor takes the line trunk groups in the first category out of operation.

The processor that initially performed the loading of the controllers of the line trunk groups in the second category subsequently also triggers loading procedures in an analogous manner for the loading of the respective memories of the controllers of the line trunk groups in the first category. For this purpose, in accordance with an embodiment of the invention, it can be arranged that this processor forms a connection in a known manner over the respective data links with the controllers of these line trunk groups. When these controllers have also been loaded, the second processor, which has performed the loading, makes the controllers of the line trunk groups in the first category again accessible to the connected concentrators for connecting data for new connections. The second processor, which has performed the loading procedures, also transmits corresponding data to the other processor, which was previously the operative processor, after it has once again formed a connection with that processor for that purpose.

As has been explained, after the loading of the respective memories of the respective local controllers—initially only of the line trunk groups in the second category—both the respective central processor which has performed the loading and the central processor that has been operative up to that point participate for the time being simultaneously in the establishment of connections. After this loading has been completed by the processor in question, connections are formed over the switching matrix that correspond to it; at the same time new connections are also still being formed temporarily over the other switching matrix. Should the controllers of the line trunk groups in the first category have been made inaccessible to connecting data for new connections in the manner described above, further new connections may be made for the time being only over line trunk groups in the second category. However, connections that are already in the process of being established over the line trunk groups in the first category are completed to the final switching. In addition, connections that are being switched through or have already been switched through, continue to exist until they are released. The release of the connection may take place not only through the action of the participating subscriber in question, but also after the expiration of a specific maximum period of time. In this case, the maximum period can be measured, for example, from the moment at which either the loading procedure is completed or the line trunk groups in the first category are made inaccessible to connecting data for new connections.

According to the above embodiment, the processor by which the loading of the controllers of a category—in the above example, the second category—has initially been performed, thus switches the data links through to the controllers of these line trunk groups after the line trunk groups in the first category have been withdrawn from operation as described above, performs the loading described above with them and then makes these controllers, after the loading, again accessible to connecting data for new connections. In this situation, it can also switch the processor that was originally operative to the non-operative state. This takes place in a manner that is familiar to those skilled in the art. The processor that has performed the loading for all the line trunk groups also transmits new information and data corresponding to this loading to the processor that had originally been operative, and the latter stores them.

As has been explained above, the processor that has given the information and data described in detail above to all the line trunk groups in the second category and which has therefore loaded certain memories of their controllers in the corresponding manner, also transfers this information to the processor that was originally operative, which thereby, through appropriate storage procedures, makes this new information and data part of its own files. According to another, especially important embodiment, which is different from the preceding embodiment, after the loading of the controllers in the second category by the other processor (which thus was not originally the operative processor) has been completed as described above and after the above-mentioned takeover of the processor function that is operative with regard to the switching procedures by this other processor, and after completion of the blocking, in connection with this takeover, of the controllers of the line trunk groups in the first category with respect to connecting data which the concentrators in question would otherwise give to the controller has been completed, the files of new information and new data (as mentioned above) are transmitted by the other processor (in other words, the one that was originally non-operative) first to the processor that was originally operative—and only by the former to the latter. There is therefore no transmission of this new information and new data directly from this other processor to the controller of the line trunk groups in the first category in this case. Once the processor that was originally the operative processor has received and stored the new information and data in this manner, it thereupon drives the controllers of all line trunk groups in the first category simultaneously and, at the same time, transmits this new information and new data to them. The information and data are stored in a familiar manner in corresponding memories of the controllers of the line trunk groups of the first category.

According to this embodiment, therefore, the other processor is relieved of the task of loading the controllers of the line trunk groups in the first category with the new information and data. As a result of the fact that this new information and data are transmitted by the other processor directly to the processor that was operative, that is, after the loading of the controllers of the second category by the other processor and after the processor function that is operative with respect to the switching procedures has been taken over by the other processor and after the blocking, in connection with this takeover, of the controller of the line trunk groups in the first category with respect to connecting data from concentrators connected to these lines trunk groups in the first category has been completed, that central processor which was originally the operative processor now takes over and performs the task of transmitting the new information and the new data to the controllers of the line trunk groups of the first category. For this purpose, it drives these controllers simultaneously and, at the same time, transmits the new information and data to these controllers.

Thus, while the other processor has already taken over the operative function with respect to the performance of the switching procedures, the first processor, that was originally the operative one, now no longer performs the procedures for loading the controllers of the line trunk groups-in the first category with the new information and data. Of special importance here are the simultaneity and the fact that the other processor, which is already heavily burdened with connecting procedures, is not concerned with these loading procedures. In addition, the said first processor can perform the loading procedures for all controllers of the line trunks groups in the first category at the same time, because the controllers of all the line trunk groups in the first category—and only these—have been marked within it by storage techniques as accessible, and it can therefore drive them all simultaneously, as described in detail above.

Processors ZW1 and ZW2 each have a memory ($1za$ and $2za$ respectively), in which the addresses of the controllers (GP . . . ) that are currently available to them for an exchange of information and data have been marked by storage techniques as accessible, for example by reading in the addresses in question or by adding a flag bit to each of the addresses that have already been stored. In addition these processors each have a memory ($1zc$ and $2zc$ respectively) for the said (new) data, as well as a read/write device ($1zb$ and $2zb$ respectively) for storing (writing in) and retrieving (reading out) these addresses, flag bits, information and data when the respective partner processor and the corresponding memories GR1 and GR2 in the controllers of the line trunk groups LTG1 and LTG2 have been loaded or are being loaded. The write/read devices also participate in the driving of the line trunk groups and their controllers when the relevant memories GR1 and GR2 are being loaded with new information and data. The said memories $1zc$ and $2zc$ and $1zd$ and $2zd$ can also be subdivided in an appropriate manner for the separate gathering of information and data with respect to the process described above, in which information and data must be exchanged for new information and data. The new information and data are therefore stored separately from the information and data that have been used up to that point for the switching operations.

The entire description so far has been concerned with an exchange of information and data and the loading of the controllers of line trunk groups with new information and data. This loading can also proceed through the controllers, and it is provided that the concentrator processors are also loaded with this new information and data at the same time.

The loading performed by the central processors can become necessary and be performed in the event of intentional changes in the files of existing information and data, but also when errors have occurred that make it imperative to bring the said files to the most up-to-date and absolutely correct condition. However, such a loading can also be provided for in connection with an exchange of the central processor themselves, for example, when a pair of processors is to be replaced by a pair of processors of a different type, for example, of a newer type. For this situation it is provided that the other processor is interchangeable with a first alternate processor, after the further connection establishment procedures are performed with the aid of the line trunk groups belonging to the first category and before the other processor performs the loading procedures with the controllers of the line trunk groups belonging to the second category. In addition, it is provided that the first processor, after the blocking of the controllers of the line trunk groups in the first category has been completed and before receipt of the loading with the above-mentioned new information and data by the other processor, is interchangeable with a second alternate processor. In this case it is also possible to change the other processor even sooner than described above. A change consists in shutdown and disconnecting the former processor, with a connection in their place and the start-up of the new processors in the prescribed time frame, that is, under the above-mentioned time conditions with regard to the functional cycles of the individual steps of the loading procedures as described in accordance with the invention. When the central processors are changed, they may have stored the previous information and data. Nevertheless, the loading takes place after the change in the manner described above. This is also true if, when the processors are changed, there are new information and data to be loaded. They can be given only to the so-called other processor, which will then transmit them, in the course of the functional cycles described above, to the so-called first processor.

The mutual loading of the processors ZW1 and ZW2 with new information (for example, the other processor ZW2 loads the first processor ZW1; see above) and data can take place over a direct link z between the input/output processors G1 and G2 of the central processors ZW1 and ZW2. This direct connection can also be merely temporary, and switched through only in case of need.

It is also noted that there is stored in the concentrator processors a program which makes them compatible with the operating states both before and after the loading. If necessary, the relevant program memories in the concentrator processors are prepared for this with an appropriate stored program.

We claim:

1. A circuit arrangement for centrally controlled telecommunications exchanges, including PCM-TDM exchanges wherein are provided, in duplicate, a central switching matrix used for through-connection and a program-controlled central processor for standby operation which serves at least to control said matrix and to process the switching signals that are required for this purpose, and wherein a plurality of local line trunk groups are each equipped with a submatrix for the external connection of trunk and/or subscriber lines and with a local programmable control device to receive said switching signals from said lines, to preprocess said switching signals and transmit them to said program-controlled central processor and to transmit switching signals over these lines, and wherein, the respective submatrix in each of said line trunk groups, is connected internally group by group, separately over two groups of link circuits to switching matrix lines belonging, on the one hand, to a first, and on the other hand, to a second of the two switching matrices that are provided in parallel, and wherein, for a data exchange between the local programmable control device on the one hand and an operational or pre-operational part of the program-controlled processor, as the case may be, on the other, which serves for the switching signal operations and for the transmission of program and switching software, data connections for each local programmable control device are brought by the processor into operational condition to the local programmable control devices over one of the link circuits and through the switching matrix assigned thereto or retained therein, and wherein concentrators equipped with concentrator processors are connected, in their higher ranking switching center, to the submatrices of at least two line trunk groups, in order to perform their connecting process through one or the other of the line trunk groups, characterized in that two categories of line trunk groups are formed;

each concentrator is connected to a line trunk group in the first category and line trunk group in the second category;

to load the local programmable control devices with program information and/or line data and, when necessary, to load each of said concentrator processors with connecting data in a similar manner, firstly, the two individual connections for each line trunk group to the two switching matrices are reduced to one connection, such that the line trunk groups in the first category remain connected to the first two switching matrix and the line trunk groups in the second category to the second switching matrix, and the local programmable control devices associated with the line trunk groups in the first and second categories remain connected, through the data, to a first processor corresponding to the first switching matrix and a second processor corresponding to the second switching matrix, respectively;

secondly, further connecting procedures continue to be carried out with the aid of the line trunk groups belonging to the first category, whose local programmable control devices are connected to the first processor, which processor is still conducting the operation at the time; and thirdly, the second processor performs the loading procedures with the local programmable control devices of the line trunk groups belonging to another (for example, the second) category and that, after the loading is completed, firstly, the local programmable control devices that have been loaded by the process are made accessible to the concentrator processors by the second processor, for the transmission of connecting data for new connections, and, secondly, connecting procedures for new connections are performed thereafter by the second processor.

2. A circuit arrangement according to claim 1, wherein after loading has been completed, the processor which has thus far been the operative processor, and the other of the two processors participate simultaneously in carrying out the establishment of connections.

3. A circuit arrangement according to claim 1, wherein after said loading by the second processor has been completed, the first processor makes the local programmable control device connections associated with line trunk groups of the first category inaccessible to concentrator processors for connecting data for new connections, for example, for connecting data for connections in the process of formation, but preferably for connecting data for connecting procedures that are to be started from the very beginning.

4. A circuit arrangement according to claim 1, wherein after said loading by the second processor has been completed, the first processor makes the local programmable control device connections associated with line trunk groups of the first category inaccessible to concentrator processors for connecting data for new connections, including for connecting data for connecting procedures that are to be started from the very beginning.

5. A circuit arrangement according to claim 1, wherein after said loading by the second processor has been completed, connections are established over the switching matrix corresponding thereto, and that, at the same time, connections already in the process of formation are completed over the other switching matrix to the point where they are finally switched through, and that connections that have been so switched continue to exist until they are released.

6. A circuit arrangement according to claim 5, wherein the release of a connection may be caused not only by one of the subscribers in question, but also after a specified maximum period of time, measured from the moment at which either the loading procedure is completed or the line trunk groups in the first category have been made inaccessible for connecting data for new connections.

7. A circuit arrangement according to claim 1, wherein the processor by which the loading of the local programmable control devices of one category has initially been performed again switches through the data links to the local programmable control devices of the line trunk groups of the other category and also performs the loading with these local programmable control devices.

8. A circuit arrangement according to claim 7, wherein the processor by which the loading of the local programmable control devices of one category has initially been performed makes accessible the local programmable control devices of the line trunk groups of the other category, after they have been loaded, to connecting data for new connections.

9. A circuit arrangement according to claim 1, wherein the processor by which the loading of the local programmable control devices of the category that has initially been loaded performs the loading with respect to the other processor.

10. A circuit arrangement according to claim 1, wherein a program is stored in the concentrator processors which makes them compatible for the operating states both before and after the loading.

11. A circuit arrangement according to claim 1, wherein the connection lines, each of which can be allocated from and/or to another switching station or channels of corresponding channel systems, are connected partly to a line trunk group of one category and partly to a line trunk group of a second category, one half to each group.

12. A circuit arrangement according to claim 1, wherein the processor which has thus far been the operative processor, hereinafter referred to as the first processor, which has initially continued to be operative, after the loading of the local programmable control devices of the line trunk groups of the second category by the other of the two processors hereinafter referred to as the second processor, has been completed and the processor function that is operative with respect to the switching procedures has been taken over by the second processor and, after a blocking of the local programmable control devices of the line trunk groups in the first category with respect to connecting data has taken place in connection with this takeover, receives the loading with the new information and data from the second processor, wherein:

the first processor then loads the local programmable control devices of the line trunk groups of the first category with said information and data and thereupon interrupts the data links to said local programmable control devices, and wherein the other processor thereafter switches through data links to these local programmable control devices and again unblocks them with respect to the connected concentrators for connecting data.

13. A circuit arrangement according to claim 12, wherein the second processor is interchangeable with a first alternate processor, after the further connecting procedures are performed with the aid of the line trunk groups belonging to the first category and before the second processor performs the loading processes with the local programmable control devices of the line trunk groups belonging to the second category.

14. A circuit arrangement according to claim 12, wherein the first processor, after blocking of the local programmable control devices of the line trunk groups in the first category is completed and before receipt of the loading by the second processor with said new information and data, is exchangeable with a second alternate processor.

* * * * *